Figure 1:
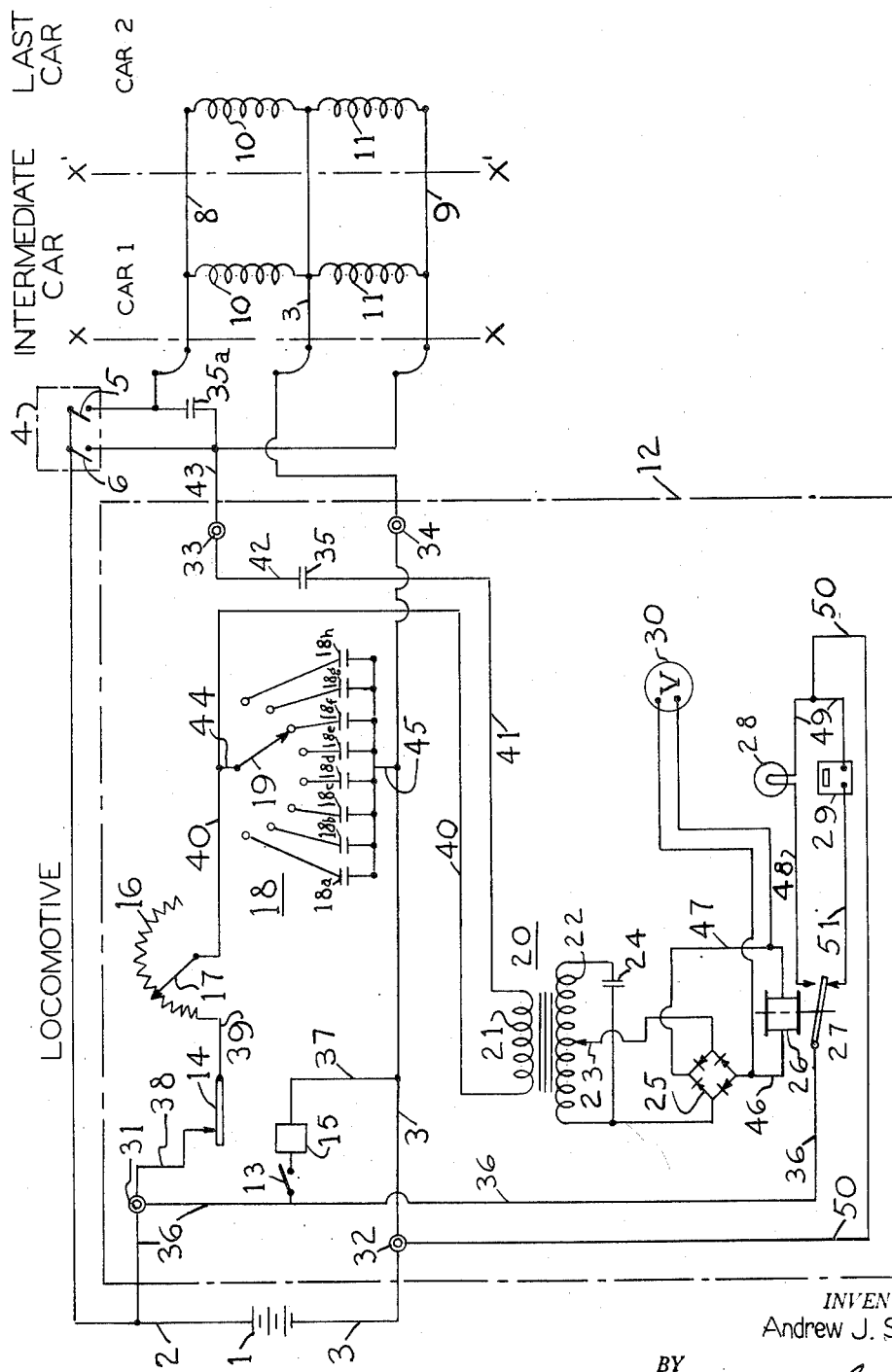

INVENTOR.
Andrew J. Sorensen
BY
Adelbert A. Steinmiller
ATTORNEY

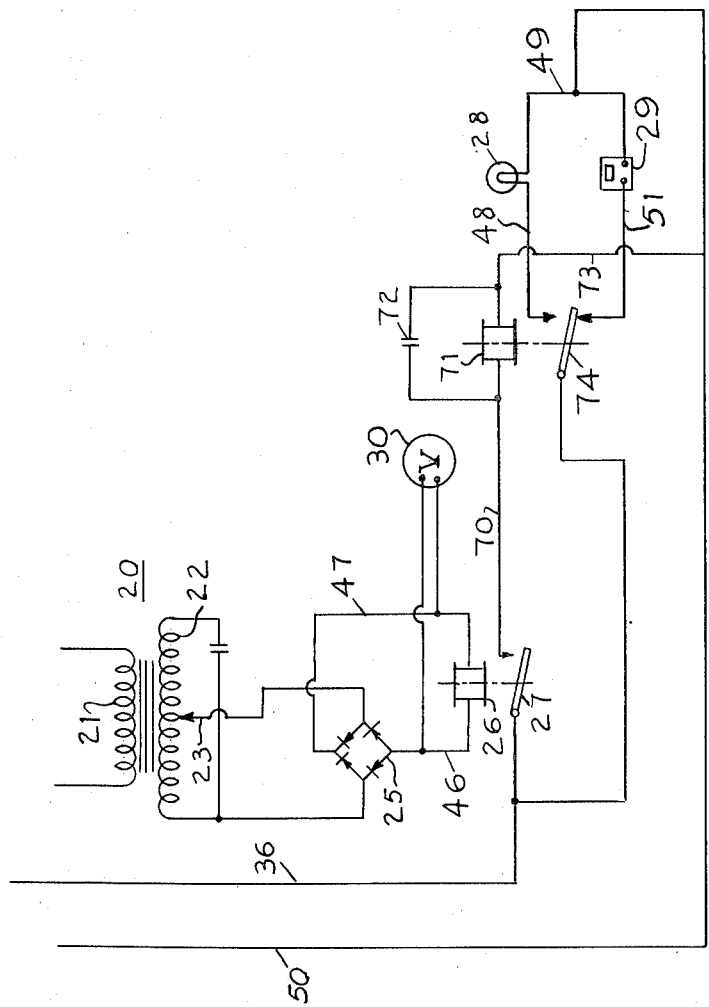

United States Patent Office

2,785,392
Patented Mar. 12, 1957

2,785,392

CHECKING EQUIPMENT FOR ELECTRIC BRAKE CIRCUIT

Andrew J. Sorensen, Edgewood, Pa., assignor to Westinghouse Air Brake Company, Wilmerding, Pa., a corporation of Pennsylvania Application July 26, 1954, Serial No. 445,516

9 Claims. (Cl. 340—213)

This invention relates to a circuit checking means and more particularly, to an apparatus adapted to be associated with the control circuits of an electro-pneumatic brake apparatus employed on a train of cars for selectively signaling the integrity or lack of integrity of the said control circuits.

The present electro-pneumatic brake systems in use on a train of cars employ control wires or circuits which extend from the locomotive or control car at the head end of the train through all the cars in the train. These control wires complete control circuits which normally include two magnet valves commonly called the application magnet valve and a release magnet valve on each car of the train, said magnet valves being controlled by common electro-pneumatic controller which is usually located on the locomotive.

The desirability of determining and indicating the integrity or lack of integrity of the electrical control circuits has been previously recognized, and various means and methods have been proposed and employed for this purpose. One such apparatus is described and claimed in the application, Serial No. 102,836, filed July 2, 1949, of C. M. Hines, now Patent No. 2,573,442, which is assigned to the assignee of this invention.

In the above-mentioned patent the integrity check is made while the brakes are released, by use of a resistance bridge arrangement. The above-mentioned apparatus and other similar types of apparatus employing a resistance bridge arrangement involve having the train lines and all the magnet valves connected in circuit relationship to the resistance bridge arrangement, such that when there is no lack of integrity in the said circuit the resistance bridge would normally be balanced to in turn effect indication of such condition. However, this type of arrangement is subject to considerable variation due to change in resistance of the temperature of the windings of the magnet valves.

It is an object of the present invention to provide an improved circuit checking apparatus characterized in that it avoids the compensations and adjustments necessary due to changes in resistance values with temperature which are present in some of the resistance bridge arrangement checking apparatus.

It is another object of the present invention to provide a new and improved circuit checking apparatus further characterized in that it employs for integrity checking purposes, an electrical characteristic of the circuit to be checked which is not influenced by temperature variations.

Another object of my invention is to provide an improved circuit checking apparatus characterized in that detection of the lack of circuit integrity is accomplished by detecting a certain change from normal total inductance of the circuit.

A further object of my invention is to provide a new and improved circuit integrity checking apparatus characterized in that a change in the total inductance of the circuit to be checked, determined by the integrity condition of said circuit, varies the resonant frequency of said circuit to effect indication of the integrity condition.

The above objects together with other objects which will be made apparent in the subsequent description of my invention, are obtained by apparatus to be hereinafter described when read in connection with the accompanying drawings wherein Fig. 1 constitutes a diagrammatic view of a simplified brake control circuit for railway cars embodying my novel circuit checking and signaling system, and Fig. 2 is a modification thereof.

While simplified brake control circuits and equipment are shown in the drawings for the purpose of illustrating the nature and utility of my novel circuit checking apparatus, it will be understood that the apparatus illustrated and described herein is intended to and may be applied to and function with conventional brake control equipment as well as various other types of control circuits.

For simplicity, I have shown in the drawing only the control circuits, the integrity of which is to be checked, and including an application valve winding and a release valve winding on each car of a train. For simplicity, only the apparatus for two cars are shown, the cars being designated herein as car 1 and car 2. Car 2 represents the last car of a train while car 1 represents the cars interposed between the last car and the locomotive and is shown on the drawing as interposed between the lines x—x and x'—x'.

*Description*

In the drawing, the simplified electric brake control circuit and apparatus comprises a source of direct current voltage such as a battery 1, on the locomotive, battery supply wire 2, return wire 3 extending throughout the train, a master controller device of the conventional pneumatically operated type, represented herein as a switch 4, having an application contact 5 and a release contact 6, contacts 5 and 6 being adapted to be connected respectively to the application wire 8 and the release wire 9 which extend throughout the train. An application magnet valve winding 10 and a release magnet valve winding 11 on each car of the train are connected respectively across the application wire 8, or the release wire 9 as the case may be, and a return wire 3 which likewise extends throughout the train.

The circuit integrity checking and signaling portion of my invention shown in the drawings is in simplified form and may be embodied in a casing 12, said casing containing therewithin a starting switch 13, a source of alternating current, shown generally herein as a contact member 14 of a conventional interrupter device 15, a variable resistance 16 having a rheostat arm 17, a condenser bank 18 having a series of condensers of various capacitance to be selectively placed in a circuit by a selector arm 19, said series of condensers being generally designated as 18a, 18b, 18c, etc., a filter transformer 20 having a primary winding 21, and a secondary winding 22 adapted to be tapped by an adjustment arm 23, a condenser 24 being placed across the secondary 22 of said filter transformer, a rectifier 25 connected across a portion of the secondary winding 22 of the filter transformer 20, the output terminals of said rectifier being connected to the winding of a relay 26 having a front and back contact member 27, said contact member 27 being adapted to selectively energize a clear lamp 28 or a warning buzzer 29. A voltmeter 30 is connected across the terminals of the winding of relay 26 for reasons to be explained hereinafter. Suitable terminals 31, 32, 33 and 34 are being provided on said casing 12 to which circuit connections are made. A blocking condenser 35 is also included in series with primary winding 21 of filter transformer 20 to prevent direct current from entering the integrity checking apparatus during a brake application thereby preventing any ill effects to the braking circuits during a brake application. Another blocking condenser 35a provides a path for flow of the alternating current, used for circuit checking purposes, to the application wire 8, while at the same time preventing shunting of the switch contacts 5 and 6.

Operation

As can be seen from Fig. 1, when switch 4 is positioned so that neither of its contact members 5 or 6 are closed, a position referred to as the brake release position, the circuit to the magnet valve windings 10 and 11 is incomplete. When switch 4 is positioned so that both contacts 5 and 6 are closed, a position referred to as the application position, both magnet valve windings 10 and 11 are energized. When only the release contact member 6 is closed, a position referred to as the "lap" position, only the release magnet valve winding 10 will be energized. It should be understood that the release magnet valve winding 11 is effective when energized to actuate a valve to close off the exhaust connection to a brake cylinder (not shown) and that the application magnet valve winding 10 is effective when energized to open a valve to supply fluid under pressure from a source (not shown) to the brake cylinder thereby to effect a brake application.

Assuming the switch 4 to be in its brake release position, the apparatus is conditioned for operation by starting the interrupter device 15. This is done by closing the starting switch 13 which completes a circuit from the battery 1 by way of supply wire 2, wire 36, terminal 31, starting switch 13, interrupter device 15, wire 37 to the return wire 3, thereby energizing and starting the interrupter device to effect intermittent opening and closing of contact member 14. When the contact member 14 is in its closed position a circuit is completed from the battery 1 by way of supply wire 2, wire 36, terminal 31, wire 38, closed contact member 14, wire 39, variable resistance 16, rheostat arm 17, wire 40 to the primary winding 21 of the filter transformer 20, wire 41, condenser 35, and wire 42 to terminal 33, thence by way of wire 43 and condenser 35a to the application wire 8, and by way of wire 43 only to the release wire 9, thence through the application and release magnet valves 10 and 11, respectively, on each car of the train, to the common return wire 3, and back to battery 1. Connected in parallel with the application and release magnet valve windings 10 and 11 is a condenser circuit, preset according to train length, consisting of wire 44, selector arm 19 to one of the preselected condensers 18a to 18h of the condenser bank 18 to wire 45 and thence to the battery return wire 3, thereby charging said condenser of the condenser bank 18.

When the contact member 14 of the interrupter device is open, the circuit just described to charge the condenser of condenser bank 18 and pass through the application and release magnet valve windings is interrupted at switch 14. However, the condenser of the condenser bank 18 will then discharge through the primary winding 21 of the filter transformer 20 to the application and release wires, through the application and release magnet valve windings 10 and 11 back to the condenser in a discharge circuit. It can thus be seen that with the repeated opening and closing of the contact member 14 of the interrupter device, an oscillatory discharge will be set up including a condenser of the condenser bank 18, the primary of the filter transformer 20, the application and release wires 8 and 9 and the application and release magnet valve windings 10 and 11. This oscillatory charging and discharging circuit setup including the primary 21 of filter transformer 20 is induced into the secondary 22 of said filter transformer 20, said secondary 22 being made up of a filter circuit including condenser 24 thereby filtering the induced current in the secondary, the output of the secondary 22 thence going to the rectifier 25 where said current is rectified.

The output of rectifier 25 energizes and picks up the relay 26 by way of wires 46 and 47, thus causing contact 27 of relay 26 to be moved to its front closed position as shown in the drawing. With the contact member 27 in its front closed position, a circuit is completed from the battery 1 by way of supply wire 2, wire 36, terminal 31, wire 36, contact member 27, wire 48, the "all-clear" light 28, wire 49, and wire 50, to the battery return wire 3, thereby illuminating the "all-clear" light 28 indicating that there is no lack of integrity in the brake control circuits.

If a fault, such as a break, should occur in the train wires or in any of the magnet valves throughout the train, the combined inductance of all the valve magnets in the train would increase by a proportionate amount causing the frequency of an oscillatory discharge in the oscillatory discharge circuit to decrease accordingly. With a change of frequency, the filter associated with the secondary of transformer 20 not being tuned to this new frequency will limit induced current in said secondary. This limited induced current when rectified by rectifier 24 is not of an amount to maintain relay 26 sufficiently energized thus causing said relay 26 to be dropped out. With relay 26 deenergized, contact 27 of said relay will move to its back closed position thereby completing a circuit from the battery 1 by way of supply wire 2, wire 36, terminal 31, wire 36, contact member 27, wire 51, warning buzzer 29, wire 49, and wire 50 to the battery return wire 3 thereby sounding the warning buzzer 29 and indicating that there is a lack of integrity in the brake control circuits.

It can thus be seen from the previous description of operation that a continuous integrity check of the magnet valves and associated train wires is maintained during brake release.

The selection of the correct values of the condensers and the positioning of the selector arm 19 is determined as follows:

As is known by the study of resonant circuits and tuning principles, in a parallel oscillatory circuit at resonant frequency, the inductive reactance equals the capacitive reactance. The current therein will, in accordance with well established principles, be near a minimum and the voltage will be at a maximum respective to the voltage originally imposed on the oscillatory circuit. Using this theory as a basis, the inductive reactance of a known number of cars, say 10, with the valve windings and train wires known to be intact, is measured and matched with a condenser of equal capacitive reactance. This condenser is then appropriately labeled "10 cars" on a condenser bank 18. Similar measurements can be made with different train lengths, say 8, 6, 4, 2, and other condensers matched and labeled respectively on the condenser bank 18 until a sufficient number of condensers are available for various lengths of trains in common use. One method of accomplishing this would be to match the condensers to various train lengths by using the maximum voltage reading on the meter 30 to indicate resonance and then label the condensers according to the known train length. Once the condensers have been matched and labeled, they can be permanently labeled and used for trains of different length, thus precluding the necessity of matching and labeling every time a train is made up. It will be understood that the variable condenser arrangement, however, requires cars having standard magnet valve equipment in which the magnet valve winding inductance for each car is uniform.

The variable resistor 16 with rheostat arm 17 and/or the contact arm 23 on the transformer 20 are adjusted to deliver the correct operating voltage to the rectifier 25 and relay 26. The condenser 24 of the filter transformer is tuned such that the transformer will operate at peak performance at the resonant frequency of the oscillatory circuit regardless of the variations of the capacitor reactance or the inductive reactance, the frequency remaining the same.

If desired, taps (not shown) can be provided on the primary of the transformer 20 to provide the best overall performance regardless of train length.

*Description—Figure 2*

Fig. 2 shows a modification of a portion of the apparatus shown in Fig. 1 wherein the speed of operation of the interrupter 15 and the opening and closing of the interrupter contact 14 shown in Fig. 1 may be slowed down. This is done by the addition of a repeater relay having a drop-out time delay circuit in parallel with it, the circuit for this repeater relay is continued on from contact 27 by way of wire 70, repeater relay 71 with a time delay condenser 72 in parallel with said relay and wire 73, the front and back contact 74 of relay 71 serving the same purpose as contact 27, shown in Fig. 1, of controlling a signal lamp 28 on buzzer 29.

All other components of Fig. 2 are the same as shown in Fig. 1 and operate in the same way described in connection with Fig. 1.

Having now described the invention, what I claim as new and desire to secure by Letters Patent, is:

1. Apparatus for checking the integrity of a control circuit, said apparatus comprising in combination a source of alternating current adapted to be connected to said control circuit, variable condenser means for establishing a resonant condition in said control circuit only when the integrity of said control circuit is unimpaired, filter transformer means electrically coupled to said control circuit, said filter transformer means adapted to be operatively energized only when resonant condition exists in said control circuit, rectifier means operatively connected to and energized from said filter transformer means, relay means operatively connected to and energized by the output of said rectifier means, a source of potential, integrity indicating means including lamp means, circuit means connecting said integrity indicating means to said source of potential under control of said relay means whereby clear or fault indications are selectively provided in accordance with the energization and deenergization of said relay means.

2. Apparatus for checking the integrity of a control circuit, said apparatus comprising in combination a source of alternating current adapted to be connected to said control circuit, variable condenser means for establishing a resonant condition in said control circuit only when the integrity of said control circuit is unimpaired, filter transformer means electically coupled to said control circuit, said filter transformer means adapted to be operatively energized only when resonant condition exists in said control circuit, rectifier means operatively connected to and energized from said filter transformer means, first relay means operatively connected to and energized by the output of said rectifier means, a source of potential, second relay means energized by said source of potential and controlled by said first relay means, integrity indicating means including lamp means, circuit means connecting said integrity indicating means to said source of potential under control of said second relay means whereby clear or fault indications are selectively provided in accordance with energization and deenergization of said second relay means, and timing means for controlling the time of energization of said second relay means.

3. Apparatus for checking the integrity of a control circuit of the type having a plurality of control wires extending between two stations including a plurality of magnet coils operatively connected to said control wires, and a source of direct current voltage adapted to be connected to said control wires to effect a desired control purpose, said apparatus comprising a source of alternating current adapted to be connected to said control circuit to cause flow of alternating current therethrough, means operative in cooperation with said magnet coils and responsive to flow of said alternating current in said control circuits to produce a resonant condition therein only when the integrity of said control circuit is unimpaired, means operatively coupled to said control circuit only when said resonant condition exists therein, and indicating means operatively resposive to said last named means to indicate the integrity condition of said control circuit.

4. Apparatus for checking the integrity of a control circuit of the type having a plurality of control wires extending between two stations including a plurality of control magnet coils operatively connected to said control wires, a source of direct current voltage adapted to be connected to said control wires for a desired control purpose, and switch means for selectively connecting said source of direct current to said control wires to effect said control purpose, said apparatus comprising in combination, a source of alternating current adapted to be connected to said control circuit, rheostat means connected in series in said control circuit, condenser means operative cooperatively with said rheostat means and said magnet coils in said control circuit to produce a condition of resonance in said control circuit when said alternating current is connected to said control circuit, filter trasformer means operatively coupled to said control circuit only when said resonant condition exists therein, means operatively connected to and energized from said filter transformer means, and integrity indicating means operative in accordance with energization or deenergization of said last named means.

5. Apparatus for checking the integrity of a control circuit of the type having a plurality of control wires extending between two stations including a plurality of control magnet coils operatively connected to said control wires, a source of direct current voltage adapted to be connected to said control wires for a desired control purpose, and switch means for selectively connecting said source of direct current to said control wires to effect said control purpose, said apparatus comprising in combination, a source of alternating current adapted to be connected to said control circuit, means operative in cooperation with said magnet coils and responsive to flow of said alternating current in said control circuit to produce a resonant condition therein only when the integrity of said control circuit is unimpaired, transformer means having a primary winding operatively coupled to said control circuit and a secondary winding, tuning circuit means operatively connected to said secondary winding and adapted such that an operating voltage may be induced therein only when said resonant condition exists in said control circuit and said primary winding, means operatively connected to and energized from said secondary winding of said transformer means, and integrity indicating means operative in accordance with energization of said last named means.

6. Apparatus for checking the integrity of a control circuit of the type having a plurality of control wires extending between two stations including a plurality of magnet coils operatively connected to said control wires, and a source of direct current voltage adapted to be connected to said control wires to effect a desired control purpose, said apparatus comprising in combination a source of alternating current adapted to be connected to said control circuit, means operative in cooperation with said magnet coils and responsive to flow of said alternating current in said control circuits to produce a resonant condition therein only when the integrity of said control circuit is unimpaired, filter transformer means coupled to said control circuit, meter means operatively connected to said filter transformer means for indicating existence of a resonant condition in said control circuit, relay means operatively connected to and energized by said filter transformer means, and indicating means controlled by said relay means for indicating the integrity condition of said control circuit.

7. Apparatus for checking the integrity of a control circuit of the type having a plurality of control wires extending between two stations including a plurality of control magnet coils operatively connected to said control wire, a source of direct current voltage adapted to be connected to said control wires for a desired control purpose, and switch means for selectively connecting said source of direct current to said control wire to effect said control purpose, said apparatus comprising in combination, a source of alternating current adapted to be connected to said control circuit to cause flow of alternating current therethrough, means operative in cooperation with said magnet coils and responsive to flow of said alternating current in said control circuits to produce a resonant condition therein only when the integrity of said control circuit is unimpaired, condenser means connected in circuit relationship with said last named means and said control circuit adapted to prevent said direct current voltage from effecting said last said means, transformer means operatively coupled to said control circuit only when said resonant condition exists therein, and indicating means connected to and operatively controlled by said transformer means to indicate the integrity condition of said control circuit.

8. Apparatus for checking the integrity of a control circuit of the type having a plurality of control wires extending between two stations including a plurality of control magnet coils operatively connected to said control wires, a source of direct current voltage adapted to be connected to said control wires for a desired control purpose, and first switch means for selectively connecting said source of direct current to said control wires to effect said control purpose, said apparatus comprising in combination a source of alternating current, second switch means for connecting said alternating current to said control circuit, rheostat means operatively connected to said control circuit to effect regulation of said alternating current therein, variable condenser means operative cooperatively with said rheostat means and said magnet coils in said control circuit to produce a condition of resonance in said control circuit when said alternating current is connected thereto, transformer means operatively coupled to said control circuit, blocking condenser means operatively connected to said control circuit adapted to prevent said direct current voltage from effecting operation of said rheostat means, said variable condenser means and said transformer means, said transformer means having a primary winding and a secondary winding, tuning circuit means operatively connected to said secondary winding and adapted such that an operating voltage may be induced therein only when said resonant condition exists in said control circuit and connected primary winding, rectifier means operatively connected to and energized from said secondary winding of said transformer means, relay means operatively connected to and energized by the output of said rectifier means, meter means connected to the output of said rectifier means and adapted to indicate the existence of resonant condition in said control circuit, integrity indicating means including lamp means, circuit means connecting said integrity indicating means to said source of direct current voltage under control of said contact arm whereby clear or fault indications are selectively provided in accordance with energization and deenergization of said relay means.

9. Apparatus for checking the integrity of a control circuit energizable by direct current for a desired control purpose, said apparatus comprising in combination, a source of alternating current connected to said control circuit, variable condenser means for establishing a resonant condition in said control circuit dependent upon the integrity of said control circuit being unimpaired, filter transformer means having a primary winding and a secondary winding, the primary winding being connected in series with said control circuit and energized by the alternating current in the said control circuit, rectifier means connected to and energized from the secondary winding of said filter transformer means, current-responsive relay means connected to and operatively energized by the output from the secondary winding of said filter transformer means only when a resonant condition exists in said control circuit, a source of potential, a clear indication lamp, a fault indication lamp, circuit means connecting both of said lamps to said source of potential under the control of said relay, said relay completing said circuit means for energizing said clear indication lamp so long as the relay is operatively energized and said relay being effective to complete said circuit means for energizing said fault indication lamp while said relay is not operatively energized.

References Cited in the file of this patent

UNITED STATES PATENTS

| 2,193,945 | Strauss et al. | Mar. 19, 1940 |
| 2,464,978 | Hines | Mar. 22, 1949 |
| 2,690,477 | Friedmann et al. | Sept. 28, 1954 |
| 2,695,399 | Martin | Nov. 23, 1954 |